(12) United States Patent
Ryther et al.

(10) Patent No.: US 9,933,071 B2
(45) Date of Patent: Apr. 3, 2018

(54) SEAL AND METHOD OF MANUFACTURING AND/OR USING SAME

(71) Applicant: AKTIEBOLAGET SKF, Gothenburg (SE)

(72) Inventors: Tyler James Ryther, SLC, UT (US); Raymond Lee Chaplin, III, Draper, UT (US); Daniel K. Zitting, St. George, UT (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/631,222

(22) Filed: Feb. 25, 2015

(65) Prior Publication Data

US 2016/0245406 A1    Aug. 25, 2016

(51) Int. Cl.
| | | |
|---|---|---|
| *F16J 9/10* | (2006.01) | |
| *F16J 9/12* | (2006.01) | |
| *F16J 15/16* | (2006.01) | |
| *F16J 15/3208* | (2016.01) | |
| *F16J 15/56* | (2006.01) | |

(52) U.S. Cl.
CPC . *F16J 9/10* (2013.01); *F16J 9/12* (2013.01); *F16J 15/166* (2013.01); *F16J 15/3208* (2013.01); *F16J 15/56* (2013.01)

(58) Field of Classification Search
CPC ..... F16J 15/166; F16J 15/3208; F16J 15/3244
See application file for complete search history.

(56) References Cited

U.S. PATENT DOCUMENTS

| | | | | |
|---|---|---|---|---|
| 4,219,204 A | * | 8/1980 | Pippert | F16J 15/166 277/530 |
| 5,595,697 A | * | 1/1997 | Wada | F16J 15/3244 264/135 |
| 8,690,534 B1 | * | 4/2014 | Janocko | F16J 15/164 277/508 |
| 2004/0113371 A1 | * | 6/2004 | Zutz | F16J 15/344 277/630 |
| 2006/0066058 A1 | * | 3/2006 | Holt | F16J 15/166 277/584 |
| 2008/0017814 A1 | * | 1/2008 | Berckenhoff | E21B 33/061 251/1.3 |

* cited by examiner

*Primary Examiner* — Kristina Fulton
*Assistant Examiner* — L. Susmitha Koneru
(74) *Attorney, Agent, or Firm* — Mark Ussai; SKF USA Inc. Patent Dept.

(57) ABSTRACT

A seal and method of manufacturing same that provides increased service life and is preferably configured to provide both a dynamic seal and a static seal while demonstrating improved rigidity.

17 Claims, 3 Drawing Sheets

SEAL AND METHOD OF MANUFACTURING AND/OR USING SAME

BACKGROUND

The present invention is generally directed to seals and, more specifically, to seals adapted for use in extreme environments and/or adapted for longer service life.

Conventional seals tend to fail under extreme heat or use after relatively short service lives. It may be advantageous to provide a seal which may include: a static seal that is better configured to prevent media migration into a gland area; that forms a superior dynamic seal; that is configured to allow for thermal and/or chemical expansion within the space provided by the associated housing and gland; that has sufficient rigidity to withstand aggressive environments for prolonged periods of use; that is suitable for use as part of new equipment or can be retrofit into existing equipment; and/or that provides a longer service life.

SUMMARY

Briefly speaking, one embodiment of the present invention is directed to a seal configured to seal a dynamic surface that is movable in an axial direction. The seal may include a seal body having a first axial seal surface configured to be adjacent to the dynamic surface during use, a second axial seal surface, a first radial seal surface, and a second radial seal surface. The seal body preferably includes a ring, a primary seal, and a loading element. The ring can have an outer ring surface including a first axial ring surface. The first axial ring surface may form part of the first axial seal surface. The primary seal may be disposed on the outer ring surface and form part of the first axial seal surface as well as form part of the second axial seal surface. The primary seal can form a dynamic seal configured to engage the dynamic surface during use. The loading element may be disposed on the primary seal and form part of the second axial seal surface. The loading element can form a static seal on the first radial seal surface.

In a separate aspect, the present invention is directed to a method of using a seal configured to seal a dynamic surface that is movable in an axial direction. The method including the steps of: providing a seal body having a first axial seal surface configured to be adjacent to the dynamic surface during use, a second axial seal surface, a first radial seal surface, and a second radial seal surface, the seal body comprising a ring, a primary seal, and a loading element; wherein the step of providing further comprises the ring having an outer ring surface including a first axial ring surface, the first axial ring surface forming part of the first axial seal surface, the ring comprises a rigid material; wherein the step of providing further comprises the primary seal disposed on the outer ring surface and forming part of the first axial seal surface and forming part of the second axial seal surface, the primary seal forming a dynamic seal configured to engage the dynamic surface during use, the primary seal comprising an abrasion resistant material that is not elastomeric; wherein the step of providing further comprises the loading element disposed on the primary seal and forming part of the second axial seal surface, the loading element forming a static seal on the first radial seal surface, the loading element comprising a chemically resistant elastomeric material; and applying an axial compression on the seal body.

In a separate aspect, the present invention is directed to a method of manufacturing a seal configured to seal a dynamic surface that is movable in an axial direction. The method including the steps of: providing a seal body having a first axial seal surface configured to be adjacent to the dynamic surface during use, a second axial seal surface, a first radial seal surface, and a second radial seal surface, the seal body comprising a ring, a primary seal, and a loading element; wherein the step of providing further comprises the ring having an outer ring surface including a first axial ring surface, the first axial ring surface forming part of the first axial seal surface, the ring comprises a rigid material; wherein the step of providing further comprises the primary seal disposed on the outer ring surface and forming part of the first axial seal surface and forming part of the second axial seal surface, the primary seal forming a dynamic seal configured to engage the dynamic surface during use, the primary seal comprising an abrasion resistant material that is not elastomeric; and wherein the step of providing further comprises the loading element disposed on the primary seal and forming part of the second axial seal surface, the loading element forming a static seal on the first radial seal surface, the loading element comprising a chemically resistant elastomeric material.

In a separate aspect the present invention is directed to a seal configured to seal a dynamic surface that is movable in an axial direction. The seal may include a dynamic seal that is configured to engage the dynamic surface during use and a static seal formed by first and second lip surfaces that form an enlarged wedge like shape to increase effectiveness during extreme applications.

In a separate aspect the present invention is directed to a seal configured to seal a dynamic surface and a static surface. The static seal being formed by first and second seal lips that preferably have an angle therebetween of approximately sixty five degrees to approximately eighty degrees.

In a separate aspect the present invention is directed to a seal configured to seal a dynamic surface that is movable in an axial direction and which forms a static seal against a static surface to prevent media ingress into the gland area. The seal having a cutout on one side of the static seal and a cavity on another radial side of the static seal which are configured such that when viewed in radial cross section, the cutout and cavity have generally identical diameters or radiuses of curvature.

In a separate aspect the present invention is directed to a seal configured to seal a dynamic surface that is movable in an axial direction and which forms a static seal against a static surface to prevent media ingress into the gland area. The seal having a loading element that both forms a static seal on a radial seal surface and drives the dynamic seal toward the dynamic surface.

In a separate aspect the present invention is directed to a seal configured to seal a dynamic surface that is movable in an axial direction and which forms a static seal against a static surface to prevent media ingress into the gland area. The seal having a loading element configured such that pressure exerted on the seal by upstream media results in a generally equal amount of pressure exerted on a dynamic seal with the dynamic surface and a generally equal amount of pressure exerted on the static seal.

BRIEF DESCRIPTION OF THE DRAWINGS

The foregoing summary, as well as the following detailed description of the preferred embodiment of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENTS

Figure 1:
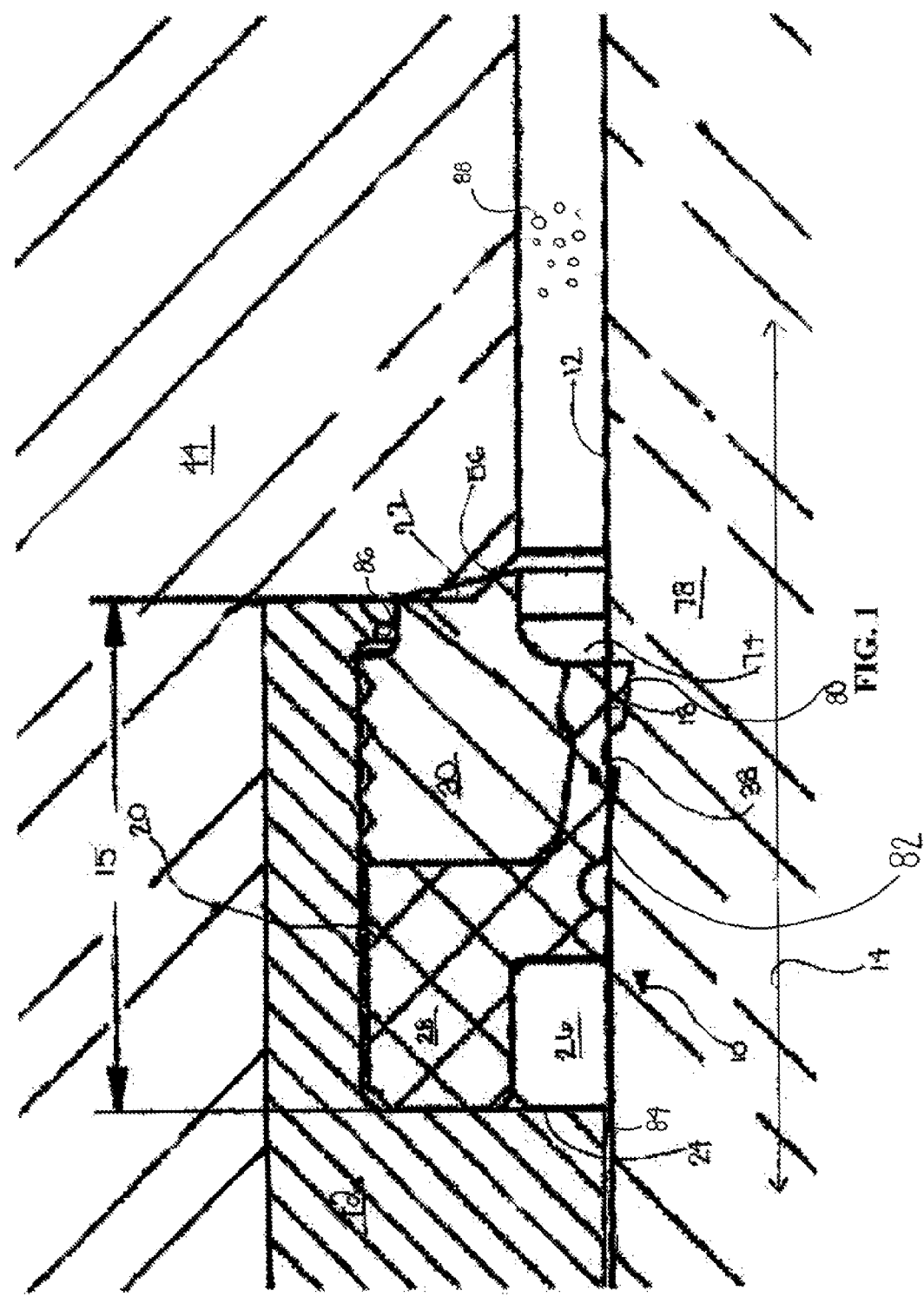
FIG. 1 is a partial radial cross section view of a seal according to one preferred embodiment of the present invention positioned around a plunger and within a housing and gland.

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the seal and designated parts thereof. The term "dynamic surface", as used in the specification and/or in the corresponding portions of the specification, means "any surface which is in motion relative to another". For example, when the seal is secured in a static position against the housing except for one side that interfaces with a movable part, then the contacting surface of that movable part can be considered to be the dynamic surface. Some examples of a dynamic surface are the outer surface of a shaft, the outer surface of a piston shaft, the outer surface of a plunger, the inner surface of a cylinder bore, the outer surface of a piston rod, a valve, or the like. The term "axial" is used in the claims and the corresponding portions of the specification in connection with the various surfaces of the seal and associated components. However, those of ordinary skill in the art will appreciate that the use of the term "axial" does not imply a precisely linear and/or horizontal surface but instead is used to identify a surface in general, unless stated otherwise. For example, an axial surface may include a sawtooth profile, a channel, or the like therein. Similarly, the term "radial" is used in the claims and the corresponding portions of the specification in connection with various surfaces of the seal and associated components. However, those of ordinary skill in the art will appreciate that the use of the term "radial" does not imply a precisely linear and/or vertical surface but instead is used to identify a surface in general in relationship to the drawings unless stated otherwise. For example, a radial surface may include a lip that forms a seal, a cavity or the like. The language "at least one of 'A', 'B', and 'C'," as used in the claims and/or in corresponding portions of the specification, means "any group having at least one 'A'; or any group having at least one B'; or any group having at least one 'C'; —and does require that a group have at least one of each of 'A', 'B', and 'C'." Additionally, the words "a" and "one" are defined as including one or more of the referenced item unless specifically stated otherwise. The terminology includes the words above specifically mentioned, derivatives thereof, and words of similar import.

Figure 2:
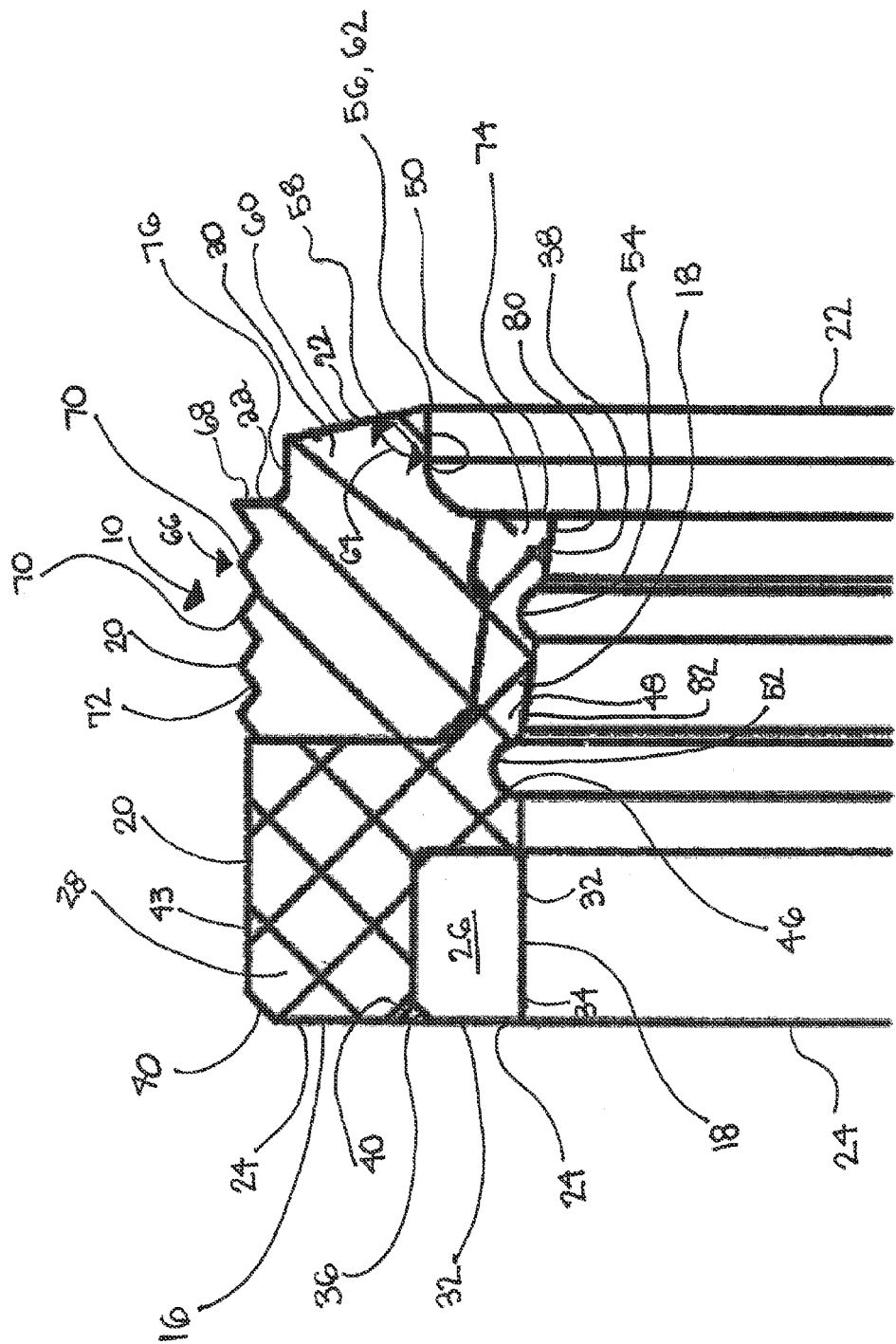
FIG. 2 is a partial radial cross section of the seal of FIG. 1.
Figure 3:
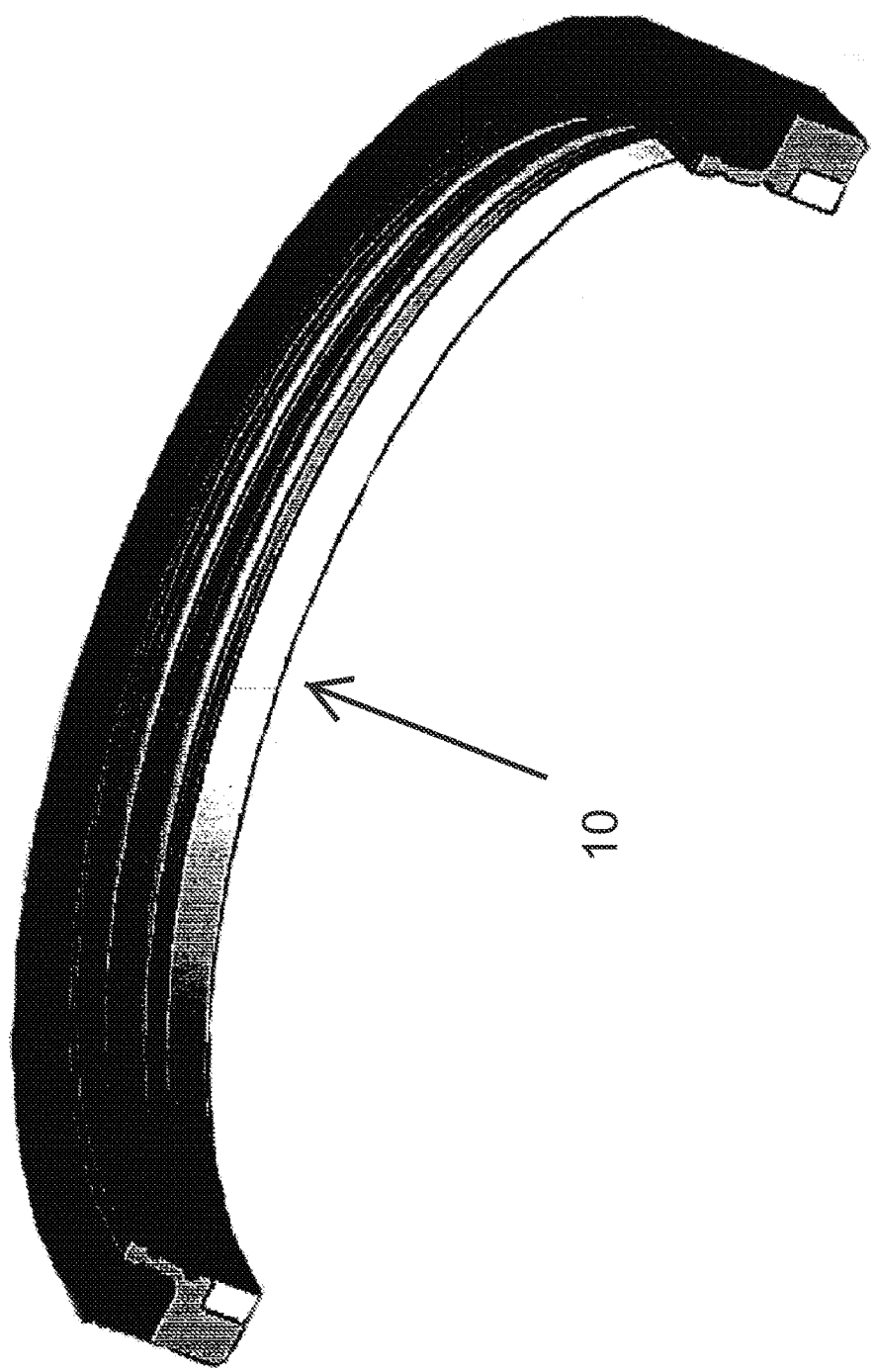
FIG. 3 is a perspective view of a segment of the seal of FIG. 1.

Referring to FIGS. 1-3 wherein like numerals indicate like elements throughout, there is shown a preferred embodiment of a seal 10 which is preferably used to increase the service life of pump packings in heavy-duty applications, such as hydraulic fracture fluid pumps. The seal 10 is preferably constructed to be ideal for use in the initial manufacture of extremely large hydraulic fracture fluid pumps as well as for use in retrofitting of such pumps. The structure of the seal 10 according to the present invention and its associated functionality results in increased service life of the seal 10 over existing industry-standard seals. Alternatively, the seal 10 may be used in any suitable application without departing from the scope of the present invention.

Referring to FIG. 1, the seal 10 is preferably configured to seal a dynamic surface 12 that is movable in an axial direction 14. The seal body 16 preferably has a first axial seal surface 18 configured to be adjacent to the dynamic surface 12 during use. In the application shown in FIG. 1, the first axial seal surface 18 is the radial inner axial surface. However, those of ordinary skill in the art will appreciate that depending upon the application for which the seal 10 is used the first axial seal surface 18 may be the outer axial seal surface without departing from the scope of the present invention. For example, if the seal 10 of the present invention were used to form a seal against a cylinder bore dynamic surface, then the first axial seal surface 18 would actually be the outer axial seal. When the seal 10 is used as part of a pump packing as shown in FIG. 1, then it is preferable that the first axial seal surface 18 is adjacent to a dynamic surface 12 that is formed by a plunger, piston rod, or the like.

Referring to FIG. 2, the seal body 16 preferably includes a second axial seal surface 20 shown at the top of the drawing. On the right side of the radial cross-section of the seal 10 is a first radial seal surface 22. On the left side of the cross-section of the seal 10 is a second radial seal surface 24. The seal body 10 preferably includes a ring 26, a primary seal 28, and a loading element 30. Those of ordinary skill in the art will appreciate from this disclosure that additional components can be incorporated into the seal body 10 without departing from the scope of the present invention.

The ring 26 is preferably made from a rigid, industry-standard backup material designed for the pressure rating of the application. It is preferred that the ring 26 is machined from billet stock using current manufacturing techniques. One example of material that can be used to form the ring 26 is unreinforced, semi-crystalline thermoplastic based on polyethylene terephthalate (PET-P). It is preferable that the ring 26 have a shear strength, measured at seventy three degrees Fahrenheit of approximately eight thousand five hundred pounds per square inch. However, Those of ordinary skill in the art will appreciate from this disclosure that the term "rigid", as used in the claims includes "any shear strength above approximately seven thousand pounds per square inch". However, those of ordinary skill in the art will appreciate from this disclosure that any suitable material or manufacturing technique can be used to manufacture the ring 26 without departing from the scope of the present invention. Depending on the application the particular materials selected and the preferred properties can vary without departing from the scope of the present invention. For example if an application requires high thermal resistance then the materials selected for any of the components of the present invention can vary without departing from the scope of the present invention. The ring 26 preferably has an outer ring surface 32 including a first axial ring surface 34. The first axial ring surface 34 preferably forms part of the first axial seal surface 18. As shown in FIGS. 1 and 2, when viewed in radial cross-section the ring 26 preferably has a generally rectilinear shape. It is preferred that when oriented as shown in FIG. 2 that the width of the ring 26 is somewhat greater than the height of the ring 26. Additionally, the upper left portion of the ring 26 preferably includes a beveled edge 36. The beveled edge extends generally into the seal 10 as one moves along the beveled edge generally upwardly and rightwardly along the left side of the ring 26. Although it is preferred that the ring 26 have a generally rectilinear shape, those of ordinary skill in the art will appreciate from this disclosure that any suitable cross-sectional shape can be used by the ring 26 without departing from the scope of the present invention. For example, the first axial ring surface 34 may have a channel therein to facilitate the lubricant flow or reduce mass without departing from the scope of the present invention. As best shown in FIG. 2, the placement of the ring 26 (when viewing a radial cross-section thereof) is preferably, but not necessarily, in the lower left portion of the cross-section. Referring to FIG. 1, the ring 26 is preferably supported in the carrier 42 proximate to a gap 84 between the carrier 42 and the dynamic surface 12 that extends generally leftwardly from the seal 10. It is preferred that the ring 26 itself not contribute directly to sealing against the dynamic surface 12. Instead it is preferred that the ring 26 prevent or reduce the 'nippling' of the primary seal into the gap 84. That is when the seal is in use under extreme pressures for an extended period of time it could be possible that, absent the ring 26, the primary seal 28 could gradually deform and extend into the gap 84. Over time, such deformation could increase, start to fill the gap 84, eliminate the dynamic sealing of the seal 10, and generate a service failure of the seal 10.

Additionally, while it is preferred that the ring 26 is a component that is formed separately from the primary seal 28, Those of ordinary skill in the art will appreciate from this disclosure that they can be formed in a single operation while slightly varying the material composition when in the area of the ring 26 without departing from the scope of the present invention. Similarly, the entire ring can be made from a single manufacturing process that is capable of changing properties throughout the seal 10 without departing from the scope of the present invention. As such, although the ring 26, the primary seal 28, and the loading element 30 are talked about as separate components, one or more of the components can be manufactured as a unitary component in one or more steps without departing from the scope of the present invention.

The primary seal 28 is preferably disposed on the outer ring surface 32 of the ring 26. Referring to FIGS. 1 and 2, it is preferable that the primary seal 28 overlap the majority of the top and right sides of the ring 26 when viewed in radial cross-section. The primary seal material is preferably chosen for high abrasion resistance and seal ability. The primary seal 28 preferably serves as the main seal for this design and its high abrasion resistance increases the life of the seal 10 dramatically. For example, one preferred material that can be used to form the primary seal 28 is an enhanced ultra high molecular weight polyethylene. One method of testing abrasion resistance of a material is known as the sand slurry test. Using the sand slurry test it is preferred that the primary seal material have an abrasion resistance approximately ten times that of steel. The term "abrasion resistant" as used in the claims is defined as "a material having at least eight times the abrasion resistance of steel as determined using a sand slurry test". Those of ordinary skill in the art will appreciate from this disclosure that any suitable material can be used for the primary seal 28 without departing from the scope of the present invention. The primary seal 28 preferably forms part of the first axial seal surface 18 and preferably also forms part of the second axial seal surface 20. As best shown in FIG. 2, the first axial seal surface 18 generally borders the bottom of the cross-section area of the seal 10 and the second axial seal surface 20 generally borders the top of the cross-section area of the seal 10.

Those of ordinary skill in the art will appreciate from this disclosure that whether the first and second axial seal surfaces 18, 20 are positioned as shown or reversed does not matter with respect to the claims or functionality of the seal 10. As such, the positioning of the first and second axial seal surfaces 18, 20 can be reversed depending upon the application for which the seal 10 is utilized. That is, the seal 10 can be configured such that the dynamic seal 38 (further described below) is configured on a radial inner surface of the seal 10 or such that the dynamic seal 38 is configured on a radial outer surface of the seal 10 without departing from the scope of the present invention.

The primary seal 28 preferably extends from the top of the ring 26 generally upwardly to form a portion of the second axial seal surface 20. Referring still to FIG. 2, the left end of the primary seal 28 preferably has beveled edges 40. It is preferred that the top left beveled edge 40 flows into a generally smooth linear surface 43 that may form a left portion of the second axial seal surface 20.

It is preferred that the primary seal 28 form a dynamic seal 38 that is configured to engage the dynamic surface 12 during use. The dynamic seal 38 preferably provides sealing against the dynamic surface 12 (which in a preferred application is a surface of a reciprocating plunger). Although FIG. 1 illustrates the dynamic seal 38 coextending with the volume of the dynamic surface 12, those of ordinary skill in the art will appreciate from this disclosure that in use, the dynamic seal 38 does not typically pass the outer portion of the dynamic surface 12. The illustration of the seal 10 in FIG. 1 is simply meant to provide some idea of the intended radial compression that occurs when the seal 10 is compressed to fit between the dynamic surface 12, a seal retainer 42 (in some applications the seal retainer will be a gland), and a receptacle 44 (in some applications the receptacle may be referred to as a compression housing, a stuffing box, or the like). It is preferred that the primary seal 28 comprise an abrasion resistant material that is not elastomeric. The retainer may have a circumferential shoulder 86 located about the opening on the right. The circumferential shoulder can be very useful in maintaining the seal 10 within the carrier 42 when the seal is shipped already positioned in the carrier for use in a pump or other application. Additionally, in some embodiments, the circumferential shoulder 86 is preferably sized to allow the seal 10 to be snapped into the carrier 42. This can greatly facilitate assembly and shipping and simplify retrofitting on site of existing equipment.

As best shown in FIG. 2, it is preferred that at least one channel 46 is defined by the primary seal 28 generally along the first axial seal surface 18. It is preferable, but not necessary, that the at least one channel 46 generally has a hemispherical cross-sectional shape. However, those of ordinary skill in the art will appreciate that the channel 46 may have any cross-sectional shape without departing from the scope of the present invention. It is further preferred that the primary seal 28 include an elongated portion 48 that extends generally axially away from the ring 26 and terminates in an enlarged head 50. Those of ordinary skill in the art will appreciate from this disclosure that the elongated portion 48 can be angled up to forty-five degrees (45°) from the first axial ring surface 34 and still be considered to extend generally axially therefrom. It is preferred that the elongated portion 48 have generally about half the thickness of that of the ring 26 as shown in FIG. 2. It is also preferred, but not necessary that the enlarged head 50 have an upper right and an upper left portion as viewed in radial cross-section that are generally rectilinear. It is preferred that the enlarged head 50 is approximately ten percent (10%) to approximately thirty percent (30%) thicker (i.e., taller as viewed in the figure) than the elongated portion 48. The seal 10 may be configured such that the elongated portion 48 and the enlarged head 50 form the dynamic seal 38.

In the embodiment shown in FIGS. 1 and 2, a first channel 52 can be defined by the primary seal 38 along the first axial seal surface 18 that does not form part of the elongated portion 48 nor the enlarged head 50 and a second channel 54 may be defined by the elongated portion 48 of the primary seal 38 along the first axial surface 18. It is preferred that the first and second channels 52, 54 have a generally hemispherical cross-sectional shape. However, those of ordinary skill in the art will appreciate from this disclosure that the first and second channels 52, 54 can have any cross-sectional shape without departing from the scope of the present invention. The bottom surface of the primary seal 38 that extends generally rightwardly from the second channel 54 can form a primary contact pattern 82. The primary contact pattern 82 preferably forms the dynamic seal 38. However, in some instances, over time leakage of media 88 can begin to leak past the primary contact pattern 82. When this happens the second channel 54 preferably provides a place for the media 88 to collect. This can be increase service life of the seal 10 because once leakage past the primary contact surface 80 occurs wear on the primary contact surface 80 may increase which can further degrade the seal. While the seal can be used in any suitable application, when used in drilling operations, the media 88 may include, mud, dirt, water, oil, gases, etc which can be at pressures of ten thousand pounds of pressure per square inch or higher.

If the primary contact surface 80 begins to lose efficiency with forming the dynamic seal 38 then the secondary contact surface 82 preferably maintains a dynamic seal and prolongs overall seal 10 service life. The first channel 52 preferably provides a hinge like effect between the main portion of the primary seal 28 and the elongated portion 48. This can be useful when the stiffness of the material forming the primary seal 28 could make downward deflection of the elongated portion and head 48, 50 more difficult than optimal. In other words, the first channel 52 may help make the dynamic seal 28 more responsive to pressure exerted on the seal 10. Those of ordinary skill in the art will appreciate from this disclosure that the first and second channels 52, 54 can be omitted without departing from the scope of the present invention.

Referring to FIG. 2, the loading element 30 is preferably disposed on the primary seal 28 and forms part of the second axial seal surface 20. The loading element 30 is preferably formed of a chemically resistant elastomeric material. It is also preferred that the loading element 30 is formed using compression molding. One preferred functional effect of the loading element's 30 configuration is the provision of a load force on the dynamic seal 38. Additionally, the loading element 30 preferably forms a static seal 56 on the first radial seal surface 22 and against a radial surface of the receptacle 44. In the embodiment shown the static seal 56 preferably performs the function of protecting the gland 42 (i.e., the earlier mentioned seal retainer 42) from material ingression. The highly chemical compatible elastomeric material which is preferably used to form the loading element 30 allows the pump packing to work in a wide variety of service fluids. Those of ordinary skill in the art will appreciate from this disclosure that the loading element 30 can be made of any suitable material using any suitable manufacturing process without departing from the scope of the present invention.

It is preferred that the loading element deform under pressure but not significantly change volume (i.e., preferably not significantly compress). Referring still to FIG. 2, the loading element 30 preferably includes cavity 74, cutout 76, and channels 72 that provide space so when the loading element is put under pressure during installation of the seal 10 into an apparatus, that the loading element preferably has space into which it can deform. For example, in one preferred application shown in FIG. 1, when the seal 10 is positioned in the carrier 42 prior to installation of the carrier 42 into the receptacle 44, the seal 10 protrudes slightly past the right side of the carrier 42. In a typical installation it is possible that the seal is compressed axially with thirty pounds per square inch of pressure between the carrier 42 and the receptacle 44. This may result in some deformation of the loading element so that the right side of the carrier 42 is flush against an adjacent radial surface of the receptacle. In those instances where the seal 10 in under axial compression during installation or use, the possible compression of the loading element 30 can be useful in compensating for tolerances in the carrier 42, receptacle 44, or other equipment components.

It is preferable that the loading element 30 is separated from the second radial seal surface 24 by the primary seal 28. The static seal 56 is preferably formed by a first lip surface 58 and the second lip surface 60 that meet at an apex 62 to form an initial engagement point of contact for the static seal 56. It is preferred that the first and second lip surfaces 58, 60 are generally smooth linear surfaces as they approach the apex 62 of the static seal 56.

The static seal 56 can be configured such that an angle 64 between the first lip surface 58 and the second lip surface 60 is between approximately forty-five degrees (45°) and approximately ninety degrees (90°). The term "approximately" when used in conjunction with degrees in the claims and the associated portions of the specification is defined as meaning "the stated degree amount plus or minus two degrees". More preferably, the angle 64 is between approximately fifty-five degrees (55°) and approximately eighty-five degrees (85°) when the seal 10 is viewed in radial cross-section. More preferably still, the angle 64 is between approximately seventy degrees (70°) and approximately eighty degrees (80°).

It is preferred that the static seal 56 forms an axial compression point to exclude media migration into the static side of the packing. Those of ordinary skill in the art will appreciate from this disclosure that the angle 64 can be varied beyond the above ranges without departing from the scope of the present invention. The angled second lip surface 60 is preferably designed in such a way that normal manufacturing tolerances will not affect the seal ability of the seal 10.

Furthermore, the configuration of the static seal 56 and the respective orientations of the first and second lip surfaces 58, 60 allow axial compression to be maintained and high sealing force to be maintained in the static sealing point across a typically wide tolerance range. This results in the seal 10 being even more economical when used as a retrofit with current manufacturing techniques or when used as part of new pump components.

As best shown in FIG. 2, when viewed in radial cross-section, the loading element 30 may form a generally sawtooth profile 66 along the second axial seal surface 20. The sawtooth profile 66 may include four and a half teeth when viewed in radial cross-section. However, those of ordinary skill in the art will appreciate from this disclosure that any number of teeth or type or combination of sawtooth profiles can be used without departing from the scope of the present invention. It is preferred that the rightmost side of the sawtooth profile 66 ends with a surface 68 generally parallel to the second radial seal surface 24. The term "sawtooth" as used in the claims and associated portions of the specification is defined as not being limited to multiple upside down triangular cross-sections but can include other various cross-sections between adjoining apexes 70. For example, the cross-section between adjoining apexes 70 can be upside down hemispherical cross-sections or the like without departing from the scope of the present invention. The sawtooth profile 66 may result in the plurality of channels 72 being formed in the loading element 30 along the second axial seal surface 20.

Referring to FIGS. 1 and 2, it is preferred that the loading element 30 and the dynamic seal 38 are configured to jointly form a cavity 74 in the seal body 16 along part of the first axial seal surface 18 and the first radial seal surface 22. Referring to the lower right portion of the cross-section of the seal 10 in FIG. 2, the radial cross-section of the cavity has a surface that extends generally inwardly from the first radial seal surface 22 that goes through a concave bend and then extends downwardly to the first axial seal surface 18. The cavity 74 is preferably configured to provide room for thermal expansion of the loading element 30 during use. Thus, the cavity 74 can allow for the elastomeric material 32 to have room for thermal expansion as well as chemical expansion. The cavity 74 preferably is designed to alleviate concerns about gland overfill when using an incompressible loading material.

Referring specifically to FIG. 2, it is preferred that a first volume of the cavity 74 is preferably between approximately five percent (5%) and approximately twenty percent (20%) of the second volume of the remainder of the seal body 16. It is more preferable that the first volume of the cavity 74 is preferably between approximately seven percent (7%) and approximately twelve percent (12%) of the second volume of the remainder of the seal body 16. In other words, when viewing the area of the radial cross-section shown in FIG. 2, it is preferable that a first area of the cavity 74 as measured between the lower right corner of the enlarged head 50 and the first radial seal surface 22 and between the contour surface of the cavity 74 is between approximately five percent (5%) and approximately twenty percent (20%) of a second area of the remainder of the solid portions of the radial cross-section of the seal body 16. As such, it is more preferable that the first area is between approximately seven percent (7%) and approximately twelve percent (12%) of the second area. Those of ordinary skill in the art will appreciate from this disclosure that the relative size of the first and second area can vary beyond the above ranges without departing from the scope of the present invention.

Referring still to FIG. 2, it is preferred that a cutout 76 is formed in an upper right corner of the radial cross-section of the loading element 30. It is preferred that the cutout 76 is formed between the first radial seal surface 22 and the second axial seal surface 20. The cutout 78 when viewed in radial cross-section preferably includes an arcuate section such that the cutout 76 and the cavity 74 have approximately the same diameter. This preferred configuration allows the media being sealed to flow in and out of the left over gland space and reduces the propensity for the media to 'pack out' in the gland. This can increase the service life of the seal 10 as pack out is very detrimental to seal performance and operational life. In some circumstances the similar size and diameter of the cavity 74 and the cutout 76 will result in reduced differential fluid pressure (or closer or generally equal fluid pressures) on both sides of the static seal 56 which facilitates preventing media ingress into the gland 42 area.

The seal 10 is preferably configured such that when the seal 10 is under axial compression, the loading element 30 exerts an increased pressure on the static seal 56 and on the dynamic seal 38. For example, as shown in FIG. 1, when the seal 10 is used around a reciprocating plunger 78 and positioned between the stuffing box 44 and the gland 42, axial pressure is exerted on the seal 10 by the gland 42. Those of ordinary skill in the art will appreciate from this disclosure that any suitable method of providing axial pressure/compression on the seal 10 can be used without departing from the scope of the present invention.

A preferred implementation of a preferred method of the present invention is described below. The steps of the method of the present invention can be performed in any order, omitted, or combined without departing from the scope of the present invention. As such, optional or required steps described in conjunction with one implementation of the method can also be used with another implementation or omitted altogether. Additionally, unless otherwise stated, similar structure or functions described in conjunction with the below method preferably, but not necessarily, operate in a generally similar manner to that described elsewhere in this application.

Referring to FIGS. 1-3, one method according to the present invention is directed to manufacturing a seal 10 configured to seal a dynamic surface 12 that is movable in an axial direction 14. The method includes providing a seal body 16 having a first axial seal surface 18 configured to be adjacent to the dynamic surface 12 during use, a second axial seal surface 20, a first radial seal surface 22, and a second radial seal surface 24. The seal body 16 may include a ring 26, a primary seal 28, and a loading element 30.

The method may include providing the ring 26 such that it has an outer ring surface 32 including a first axial ring surface 34. The first axial ring surface 34 can form part of the first axial seal surface 18.

The method may include providing the primary seal 28 so that it is located on the outer ring surface 32 and forms part of the first axial seal surface 18 and forms part of the second axial seal surface 20. The primary seal 28 preferably forms the dynamic seal 38 which is configured to engage the dynamic surface 12 during use.

The method may include the loading element 30 disposed on the primary seal 28 and forming part of the second axial seal surface 20. The loading element can form a static seal 56 on the first radial seal surface 22. The method preferably includes applying an axial compression on the seal body 16.

The method preferably includes providing the loading element 30 and the dynamic seal 38 of the primary seal 28 such that they are configured to jointly form a cavity 74 in the seal body 16 along part of the first axial seal surface 18 and the first radial seal surface 22. The cavity 74 can be configured to provide room for thermal expansion of the loading element during use. The cavity can be configured such that a first volume of the cavity 74 is preferably between approximately five percent (5%) and approximately twenty percent (20%) of a second volume of a remainder of the seal body 16.

The method may include providing a primary seal 28 having an elongated portion 48 that extends generally axially away from the ring 26 and terminates in an enlarged head 50 to form the dynamic seal 38. A first channel 52 may be defined by the primary seal 28 along the first axial seal surface 18 that does not form part of the elongated portion 48 nor the enlarged head 50 and a second channel 54 can be defined by the elongated portion 48 of the primary seal 28 along the first axial seal surface 18.

The method may include providing the loading element 30 such that it forms a saw tooth profile 66 along the second axial seal surface 20 when the seal body 16 is viewed in radial cross section. The method may also include providing a loading element 30 with a cutout 76 that is located between the first radial seal surface 22 and the second axial seal surface 20. The cutout 76 and the cavity 74 may be configured such that when the seal 10 is viewed in radial cross section both the cutout 76 and the cavity 74 have approximately the same diameter.

The method of the present invention may include providing a loading element 30 having a static seal 56 formed by a first lip surface 58 and a second lip surface 60 that meet at an apex 62 to form an initial engagement point of contact for the static seal 56. The static seal 56 can be configured such that an angle 64 between the first lip surface 58 and the second lip surface 60 is between approximately fifty-five degrees (55°) and approximately eighty-five degrees (85°) when the seal is viewed in radial cross section.

Referring to FIG. 1, one embodiment of the present invention preferably operates as follows. A plunger 78 has a dynamic surface 12 thereon. Positioned around the plunger 78 is the receptacle/retainer 44 which is configured to receive a gland 42 therein. The seal 10 is inserted into a cavity in the receptacle 44 while also being positioned over the plunger 78. When the seal 10 is properly positioned within the receptacle (a.k.a., stuffing box) 44 the primary seal 28 forms a dynamic seal 38 against the dynamic surface 12 of the plunger 78 which moves axially in relation to the seal 10. The primary seal 28 is preferably formed of high abrasion resistant material which is well configured for seal ability (such as a highly abrasion resistant plastic material). Additionally, the loading element 30 preferably forms a static seal 56 against a generally radially aligned surface of the receptacle 44 to prevent material ingress into the gland 42. The loading element is preferably formed via highly chemically resistant elastomeric material. The configuration of the loading element results in it applying a radially downward pressure on the primary seal 28 such that the elongated portion 48 and the enlarged head 50 of the primary seal 28 form the dynamic seal 38 against the dynamic surface 12 of the plunger 78. The ring 26 is preferably formed of a rigid material to provide rigidity to the seal 10 so that the seal 10 can operate under increased pressures such as those encountered during extreme use applications (for example those encountered during hydraulic fracturing and other drilling operations). The gland 42 is preferably inserted such that an axial compressive load is exerted on the seal 10. Referring to FIG. 1, the seal is shown compressed axially to a compressed width 15. This increases the force of both the dynamic seal 38 and the static seal 56. Additionally, the preferably enlarged wedge like shape of the portion of the loading element used to form the static seal 56 dramatically increases its effectiveness. As such, it is preferred that the angle 64 between first and second lip surfaces 58, 60 of the static seal 56 is between approximately sixty-five degrees (65°) and approximately eighty-five degrees (85°). The configuration of the lip used to form the static seal 56 increases its effectiveness in preventing media transfer into the gland area 42. The seal 10 is preferably configured such that the cavity 74 is located in the lower right portion of the seal (when viewed in radial cross-section as shown in FIG. 1). This cavity provides for the preferable thermal and/or chemical expansion of the elastomeric material that forms the loading element 30.

While various shapes, configurations, and features have been described above and shown in the drawings for the various embodiments of the present invention, those of ordinary skill in the art will appreciate from this disclosure that any combination of the above features can be used without departing from the scope of the present invention. For example, the orientation of the components of the seal can be reversed (when viewed in radial cross section) so that the seal 10 is configured to make a dynamic seal with a dynamic surface located radially outside of the seal circumference. Such could be the case if the seal were to be used to seal a cylinder bore dynamic surface. It is understood, therefore, that this invention is not limited to the particular embodiments disclosed, but is intended to cover all modifications which are within the spirit and scope of the invention as defined by the appended claims and/or shown in the attached drawings.

What is claimed is:

1. A seal configured for placement in a gland having an axial gland end formed by a stationary gland surface adapted to seal a dynamic surface that is movable in an axial direction, the seal comprising:

a seal body having a first axial seal surface adapted for placement adjacent to the dynamic surface during use, a second axial seal surface, a first radial seal surface, and a second radial seal surface, the seal body being a one piece member comprising a ring, a primary seal, and a loading element each of which forms a non-detachable component of the seal body;

the ring having an outer ring surface including a first axial ring surface, the first axial ring surface forming part of the first axial seal surface;

the primary seal disposed on the outer ring surface and forming part of the first axial seal surface and forming part of the second axial seal surface, the primary seal forming a dynamic seal configured to engage the dynamic surface during use;

the loading element non-detachably disposed on the primary seal and forming part of the second axial seal surface, the loading element being configured to form a static seal on the stationary gland surface formed by the axial gland end when the seal is inserted into the gland, wherein the loading element, in combination with the primary seal, is adapted to continuously maintain the dynamic seal when the seal body is positioned about the dynamic surface, wherein the primary seal comprises an abrasion resistant material that is not elastomeric, the ring is formed of rigid material, and the loading element is formed of a chemically resistant elastomeric material;

wherein the loading element forms a saw tooth profile along the second axial seal surface when the seal body is viewed in radial cross section.

2. The seal of claim 1, wherein the loading element is separated from the second radial seal surface by the primary seal.

3. The seal of claim 1, wherein at least one channel is defined by the primary seal along the first axial seal surface.

4. The seal of claim 1, wherein the primary seal includes an elongated portion that extends generally axially away from the ring and terminates in an enlarged head to form the dynamic seal.

5. The seal of claim 4, wherein a first channel is defined by the primary seal along the first axial seal surface that does not form part of the elongated portion nor the enlarged head and a second channel is defined by the elongated portion of the primary seal along the first axial surface.

6. The seal of claim 1, wherein a plurality of channels are formed in the loading element along the second axial seal surface.

7. The seal of claim 1, wherein the seal body is configured such that when the seal is under axial compression, the loading element exerts an increased pressure on the static seal and on the dynamic seal.

8. The seal of claim 1, wherein a first volume of the cavity is preferably between approximately five percent (5%) and approximately twenty percent (20%) of a second volume of a remainder of the seal body.

9. The seal of claim 8, wherein the first volume of the cavity is preferably between approximately seven percent (7%) and approximately twelve percent (12%) of the second volume of the remainder of the seal body.

10. A seal configured for placement in a gland having an axial gland end formed by a stationary gland surface adapted to seal a dynamic surface that is movable in an axial direction, the seal comprising:

a seal body having a first axial seal surface adapted for placement adjacent to the dynamic surface during use, a second axial seal surface, a first radial seal surface, and a second radial seal surface, the seal body being a one piece member comprising a ring, a primary seal, and a loading element each of which forms a non-detachable component of the seal body;

the ring having an outer ring surface including a first axial ring surface, the first axial ring surface forming part of the first axial seal surface;

the primary seal disposed on the outer ring surface and forming part of the first axial seal surface and forming part of the second axial seal surface, the primary seal forming a dynamic seal configured to engage the dynamic surface during use;

the loading element non-detachably disposed on the primary seal and forming part of the second axial seal surface, the loading element being configured to form a static seal on the stationary gland surface formed by the axial gland end when the seal is inserted into the gland, wherein the loading element, in combination with the primary seal, is adapted to continuously maintain the dynamic seal when the seal body is positioned about the dynamic surface, wherein the primary seal comprises an abrasion resistant material that is not elastomeric, the ring is formed of rigid material, and the loading element is formed of a chemically resistant elastomeric material;

wherein the loading element and the dynamic seal of the primary seal are configured to jointly form a cavity in the seal body along part of the first axial seal surface and the first radial seal surface, the cavity being configured to provide room for thermal expansion of the loading element during use;

wherein a cutout is formed in the loading element between the first radial seal surface and the second axial seal surface, the cutout and the cavity being configured such that when the seal is viewed in radial cross section both the cutout and the cavity have approximately the same diameter.

11. The seal of claim 10, wherein the static seal is formed by a first lip surface and a second lip surface that meet at an apex to form an initial engagement point of contact for the static seal, the static seal being configured such that an angle between the first lip surface and the second lip surface is between approximately fifty-five degrees (55°) and approximately eighty-five degrees (85°) when the seal is viewed in radial cross section.

12. The seal of claim 10, wherein the loading element is separated from the second radial seal surface by the primary seal.

13. The seal of claim 10, wherein at least one channel is defined by the primary seal along the first axial seal surface.

14. The seal of claim 10, wherein the primary seal includes an elongated portion that extends generally axially away from the ring and terminates in an enlarged head to form the dynamic seal.

15. The seal of claim 10, wherein a first channel is defined by the primary seal along the first axial seal surface that does not form part of the elongated portion nor the enlarged head and a second channel is defined by the elongated portion of the primary seal along the first axial surface.

16. The seal of claim 10, wherein a first volume of the cavity is preferably between approximately five percent (5%) and approximately twenty percent (20%) of a second volume of a remainder of the seal body.

17. The seal of claim 10, wherein the first volume of the cavity is preferably between approximately seven percent (7%) and approximately twelve percent (12%) of the second volume of the remainder of the seal body.

* * * * *